Feb. 16, 1965   A. YACOBIAN   3,169,739
MOUNTING FOR ANTENNAS AND THE LIKE
Filed Aug. 1, 1962
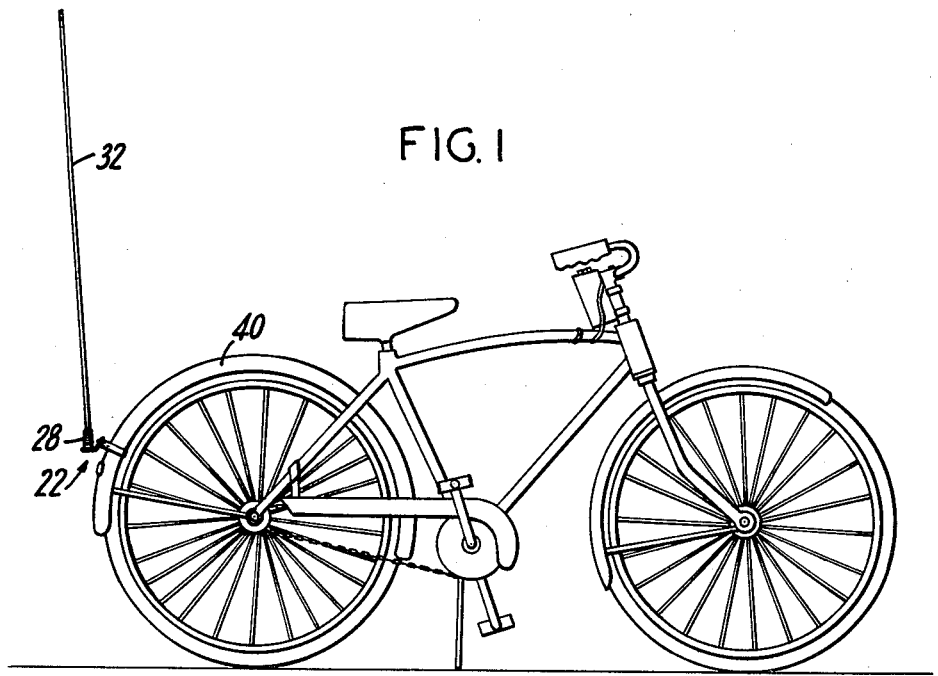
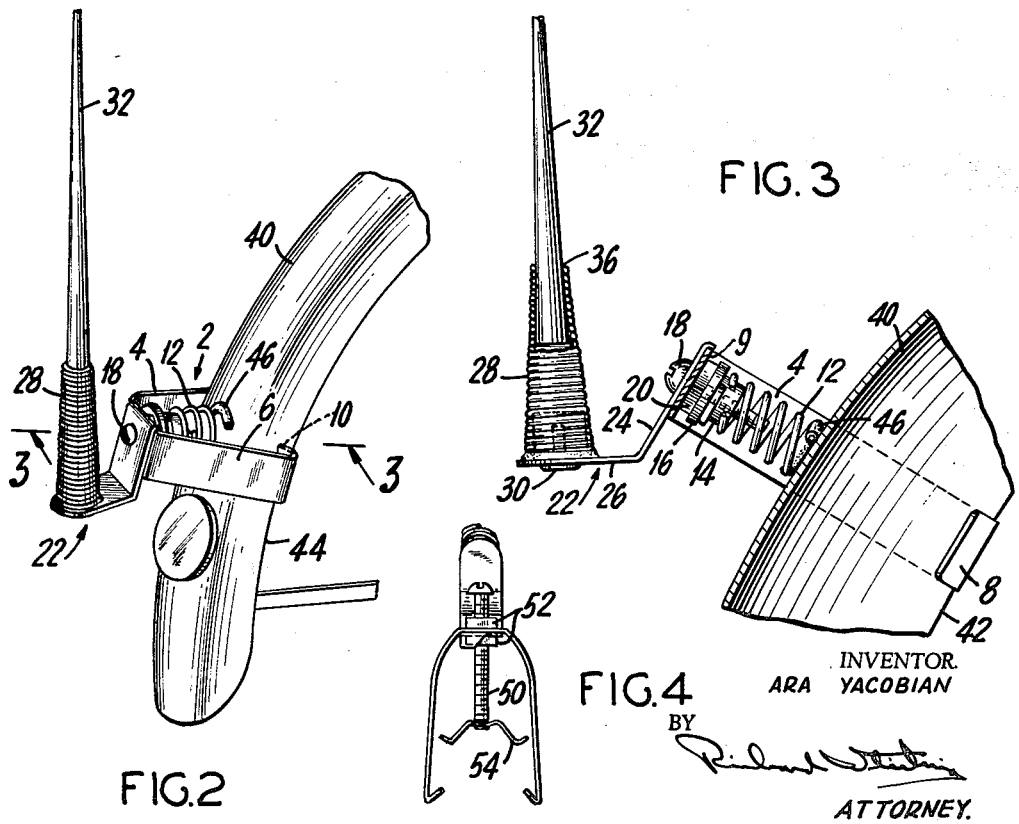
INVENTOR.
ARA YACOBIAN
BY
ATTORNEY.

United States Patent Office 3,169,739
Patented Feb. 16, 1965

3,169,739
MOUNTING FOR ANTENNAS AND THE LIKE
Ara Yacobian, 7 Edge Hill Road, Wellesley Hills, Mass.
Filed Aug. 1, 1962, Ser. No. 214,018
2 Claims. (Cl. 248—40)

This invention relates to the mounting of antennas, or the like, on the fenders of bicycles, motor bikes or motorcycles.

The effective mounting at the trailing end of the rear fender of a bicycle, of an elongated, vertically extending rod, such as a radio antenna or the like, has a number of utilitarian functions, while attendant with a number of problems. In function, a workable antenna so located is out of the path of forward vision of the rider, contributing to safety and, being out of the way, may, with entire convenience, be made considerably longer than an antenna mounted forwardly, thus enhancing its operation for radio reception. As a matter simply of appearance, which is an important consideration in the youthful market to which bicycles have their principal appeal, a long antenna vertically mounted at the rear of a bicycle is pleasing and attractive, comparable in spirit to the appearance of an antenna on a police prowl car, and thus a simulated non-functional antenna utilizing the features of the present invention has a useful purpose and a definite sales appeal.

Such mountings, must, of course, be adequately secure to hold the antenna firmly to the fender even under exceptional stresses, such as the striking of a passing object, or catching the antenna if the bicycle is laid on its side, or an intentional act of vandalism. But, in addition, the antenna should be removably mountable on different makes of bicycles, foreign and domestic, without marring the bicycle finish to afford an appliance which is practicable but yet at such modest cost as not only to appeal to the juvenile market but even, desirably, to constitute a low-cost premium which may be given away as an item of advertising.

It is the object of the present invention to provide a mounting which will fill these needs. In accordance with a preferred embodiment of the invention, the antenna-like rod is held by a spring holder supported on a bracket, which in turn is secured to a U-shaped member of resilient material, such as spring steel, having the extremities of each leg bent inwardly to form a clamping lip adapted to fit around and under each of the opposite edges of a bicycle fender to embrace the same. A pressure member such as a compression spring is mounted in the crotch of the U-member to extend toward the convexly disposed surface of the fender—the length of the spring exceeding the distance between the said crotch and the surface of the fender engaged by the spring so that the spring, under compression, abuts the fender and holds the lips in their said embracing position to secure the clamp in place. The mounting means is adjustable to vary the effective length of the compression spring to accommodate fenders of different convexities, the resiliency of the U-shaped member adapting it for variation in the spread of the legs to accommodate fenders of different widths. The said pressure means alternatively may comprise a bolt with a swivel clamping foot, as will appear.

In the drawing:

FIG. 1 is an elevational view of a bicycle with my novel antenna mount secured in place;

FIG. 2 is an enlarged perspective view of the trailing end of the rear fender showing the details of the antenna mount;

FIG. 3 is a detailed vertical section in a plane normal to the axis of the wheel through the line 3—3 of FIG. 2; and FIG. 4 shows a modification.

The mounting constructed in accordance with the preferred embodiment of my invention comprises a U-shaped member 2 having opposite legs 4 and 6 integrally joined at the base 9 (FIG. 3). At their extremities the legs 4 and 6 are bent toward each other, and then backwardly to form lips 8 (FIG. 3) and 10 (FIG. 4), respectively, forming clamps to embrace the edges of the fender as will appear. Disposed within the U member and extending from the base 9 radially inwardly toward the axis of the wheel is a compression spring 12 mounted on and fixed to a screw threaded collar 14 having a flange 16 against which the outer extremity of the spring abuts under compression. The base 8 of the U-shaped member is perforated to receive freely a bolt 18 having a lock nut 20 and extending inwardly through the corresponding screw threaded aperture in the collar 14.

A bracket 22 comprising the integral arms 24 and 26 deflected at a predetermined inclination relative to each other is secured externally of the U-shaped member at its base by means of the bolt 18 passing through an aperture in the arm 24. The arm 26 serves as a support for a coil spring 28, suitably secured to the arm 26 as by a bolt 30 screw threaded into a tapered plug friction fitted within the convolutions of the spring 28. The antenna 32, which may be functional or simulated, depending upon the purposes in view, is suitably mounted in the coil spring 28, and in the embodiment shown the antenna is made of a plastic material friction fitted into the upper extremities of the coil spring 28 and secured thereto as by brazing at 36.

With the antenna assembled on the arm 26 of bracket 22, arm 24 is secured to the U member by bolt 18 and lock nut 20. Compression spring 12 on collar 14 is adjusted in position if need be, and the mounting is then forced in place in the desired trailing position on the rear fender 40 by spreading the legs 4 and 6 of the U-shaped member and pushing the mount radially into position with the lips 8 and 10 clamped in place about the inner edges 42 (FIG. 3) and 44 (FIG. 2), respectively, of the fender and with the inner extremity 46 of the compression spring abutting the outermost crown of the fender. Desirably, the innermost convolution of the spring 12 at 46 may be rubber covered to enhance the snug fit against the fender, and to avoid marring.

Accommodation of the mounting to fenders of different widths is readily achieved by utilizing the resiliency of the U-shaped member, and variations in the depth of the fender, as presented by different bicycle makes, may readily be accommodated by variations in the effective length of the compression spring 12 adjusted by rotation of the spring and thereby of the screw threaded collar 14 on which it is mounted.

The inclination of the arms 24 and 26 of the bracket 22 accommodates the angular divergence between the radial position of the U-shaped member at the trailing end of the fender 40 and the desired vertical position of the antenna 32.

In use I have found that the antenna is securely held against accidental or intentional rough usage and that my novel mount is exceptionally well adapted for the mounting not only of antennas, functional or simulated, but for other objects such as fishing poles, flagstaffs, and the like, which are awkward and hazardous to carry on a bicycle either manually or by prior mounts known in the art.

The embodiment of my invention above described is subject to various modifications. Thus, as shown in FIG.

4, in place of the compression spring 12 I may employ, as the pressure member, an elongated bolt 50 screw threaded through nuts 52, which are suitably locked from turning; a pressure foot 54 is rotatably secured on the lower extremity of the bolt so that it may swivel and adjust itself in clamping position on the fender. My invention may, of course, be otherwise modified and is not to be limited except as the appended claims require.

I claim:

1. A clamp-mounted radio antenna for the trailing end of the rear fender of a bicycle, the fender being convexly curved and having opposite side edges, comprising a U-shape member of resilient material having the extremities of each downwardly extending leg bent inwardly and upwardly to form clamping lips adapted to fit around and under the opposite edges of the fender to embrace the same, a radio antenna, pressure means extending between the crotch of the U-shaped member and the convex curvature of the fender adapted to clamp the U-shaped member in position at the trailing end of the fender, radially of the wheel axis and at a substantial inclination to the vertical, a bracket presenting a pair of arms, one secured to the U-shaped member and the other secured to the antenna as a mounting for the same, the arms diverging from each other at an angle to accommodate the difference in inclination between that of said radially disposed U-shaped clamp and that of said substantially vertical antenna.

2. The device of claim 1 in which said pressure means comprises a compression spring mounted in the crotch of the U-shaped member to extend downwardly toward the convex surface of the fender and being under compression to clamp said U-shaped member in position.

References Cited in the file of this patent
UNITED STATES PATENTS

| | | |
|---|---|---|
| Re. 24,127 | Binns et al. | Mar. 13, 1956 |
| 1,605,249 | Loyd | Nov. 2, 1926 |
| 2,124,222 | Wiley | July 19, 1938 |
| 2,631,468 | Thomas | Mar. 17, 1953 |
| 3,056,570 | Slavin | Oct. 2, 1962 |